(12) United States Patent
Droz

(10) Patent No.: US 9,944,011 B2
(45) Date of Patent: Apr. 17, 2018

(54) PLASTIC LAYER FOR A SMART CARD

(71) Applicant: Nagravision S.A., Cheseaux-sur-Lausanne (CH)

(72) Inventor: François Droz, Corcelles (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 772 days.

(21) Appl. No.: 14/177,848

(22) Filed: Feb. 11, 2014

(65) Prior Publication Data

US 2014/0234572 A1 Aug. 21, 2014

(30) Foreign Application Priority Data

Feb. 18, 2013 (EP) ..................................... 13155635

(51) Int. Cl.
*B32B 3/24* (2006.01)
*B29C 51/12* (2006.01)
*G06K 19/077* (2006.01)

(52) U.S. Cl.
CPC ........ *B29C 51/12* (2013.01); *G06K 19/07718* (2013.01); *G06K 19/07722* (2013.01); *G06K 19/07745* (2013.01); *Y10T 428/24273* (2015.01); *Y10T 428/24479* (2015.01)

(58) Field of Classification Search
CPC .................................................... B29C 51/12
See application file for complete search history.

(56) References Cited

U.S. PATENT DOCUMENTS

| 5,514,240 | A | * | 5/1996 | Hagiiiri-Teiirani | G06K 19/07718 156/230 |
|---|---|---|---|---|---|
| 5,851,854 | A | | 12/1998 | Haghiri-Tehrani et al. | |
| 6,049,055 | A | * | 4/2000 | Fannash | G06K 1/126 219/121.66 |
| 6,513,718 | B1 | * | 2/2003 | Bouchez | G06K 19/07728 235/492 |
| 7,785,932 | B2 | | 8/2010 | Droz | |
| 2006/0172458 | A1 | | 8/2006 | Droz | |
| 2008/0272519 | A1 | | 11/2008 | Launay | |
| 2012/0313363 | A1 | | 12/2012 | LeLoarer et al. | |

FOREIGN PATENT DOCUMENTS

| EP | 0 757 330 A2 | 2/1997 |
|---|---|---|
| EP | 1 846 874 B1 | 10/2007 |
| FR | 2 895 547 A1 | 6/2007 |
| FR | 2 951 866 A1 | 4/2011 |

OTHER PUBLICATIONS

European Search Report issued in corresponding application No. EP 13155635, completed May 31, 2013.

* cited by examiner

*Primary Examiner* — William P Watkins, III
(74) *Attorney, Agent, or Firm* — Oblon, McClelland, Maier & Neustadt, L.L.P.

(57) ABSTRACT

The plastic sheet (22), involved in the formation of a plurality of smart cards which respectively include a plurality of electronic units, is formed of a first material (2), having a first hardness or a first Vicat softening temperature, and of a second material (6) having a second hardness lower than the first hardness, respectively a second Vicat softening temperature lower than the first Vicat softening temperature. The second material is located in a plurality of areas of the plastic sheet which are respectively intended to at least partially receive said plurality of electronic units, via penetration of this plurality of electronic units into the second material during fabrication of the plurality of smart cards.

15 Claims, 3 Drawing Sheets

PLASTIC LAYER FOR A SMART CARD

This application claims priority from European Patent Application No. 13155635.9 filed Feb. 18, 2013, the entire disclosure of which is incorporated herein by reference.

FIELD OF THE INVENTION

The present invention concerns the field of smart cards incorporating at least one electronic unit, in particular an integrated circuit, inside the card body. In particular, the invention concerns plastic materials forming the card body. The invention also concerns a method of fabricating a plastic layer intended to receive a plurality of electronic units during the formation of a plurality of cards.

BACKGROUND OF THE INVENTION

There is known, in particular from EP Patent No 1846874, a smart card fabrication method wherein an assembly formed of an integrated circuit and conductive segments is placed on a substrate and at least one integrated circuit is introduced into the substrate. Several variants are proposed. In a first variant, the integrated circuit is pushed straight into the material forming the substrate, the latter being relatively hard since it has conductive paths on its surface. Penetration into the material is generally achieved by using heat to soften the substrate material at least locally. In a second variant, prior to inserting the integrated circuit, a housing is arranged in the substrate having dimensions which substantially match those of the integrated circuit or are slightly different therefrom. In a third variant, a housing is formed having larger dimensions than those of the integrated circuit and an adhesive substance is deposited in the housing, prior to adding the integrated circuit assembly and conductive segments; then a fitting device presses the integrated circuit into the adhesive substance which is spread out and pushed back into the space located between the integrated circuit and the wall of the housing.

Although possible to achieve, each of the variants described above has a drawback. The first variant faces the fact that the substrate is generally formed by a relatively hard plastic layer; which requires particular precautions during fabrication of smart cards and particularly requires the areas penetrated by the integrated circuits to be at least locally softened, to avoid damaging the integrated circuits. Further, once the card is finished, the integrated circuit is surrounded by a relatively hard material; which may cause excessive mechanical stresses on the integrated circuit during use of the card, in particular when the card is subject to bending or twisting. In addition to the last mentioned problem of the first variant, the second variant raises a fabrication problem since it requires high precision positioning of the integrated circuit relative to the housing prior to insertion therein. This is possible to achieve with available fabrication plants, but the production of smart cards is then more expensive. The third variant may overcome certain of the aforementioned problems, but it requires the localised administration of drops of resin in the substrate housings in the smart card fabrication site.

SUMMARY OF THE INVENTION

It is an object of the present invention to overcome the aforementioned prior art problems and to improve the smart card fabrication method.

The present invention therefore concerns a plastic sheet involved in the formation of a plurality of smart cards which respectively include a plurality of electronic units. This plastic sheet is formed of a first material, having a first hardness or a first Vicat softening temperature, and of a second material having a second hardness lower than the first hardness, respectively a second Vicat softening temperature lower than the first Vicat softening temperature. The second material is located in a plurality of areas of the plastic sheet which are respectively intended to at least partially receive the plurality of electronic units, via penetration into the second material.

The present invention also concerns a method of fabricating a plastic sheet according to the invention, which will be described below in the detailed description.

BRIEF DESCRIPTION OF THE DRAWINGS

The invention will be described below with reference to the annexed drawings, given by way of non-limiting example, and in which.

DETAILED DESCRIPTION OF THE INVENTION

Firstly, a method will be described for fabricating a plastic sheet involved in the formation of a plurality of smart cards which respectively include a plurality of electronic units. This plastic sheet is intended to at least partially receive the plurality of electronic units by penetrating the material forming the units, as will be explained below.

Figure 1:
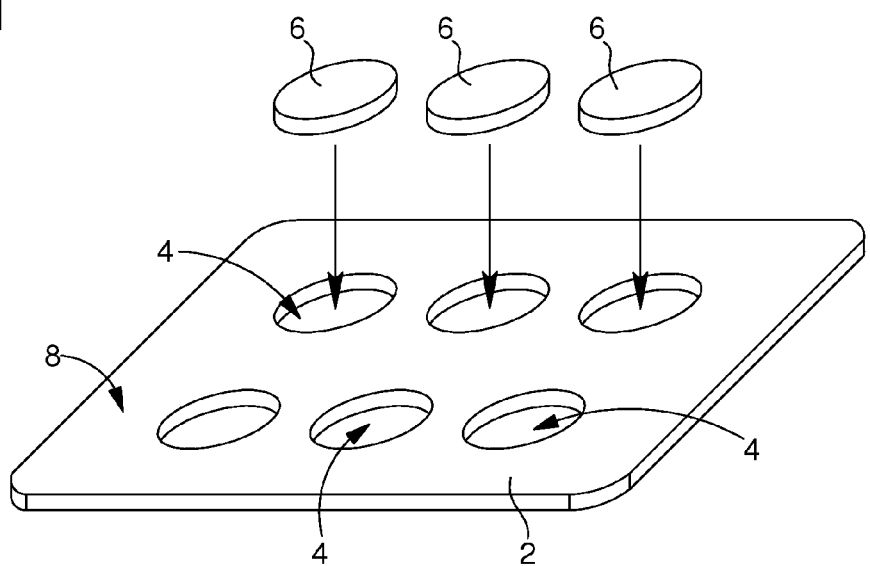
FIG. 1 is a schematic view of a step of the method of the invention for fabricating a bimaterial plastic sheet.
Figure 2:
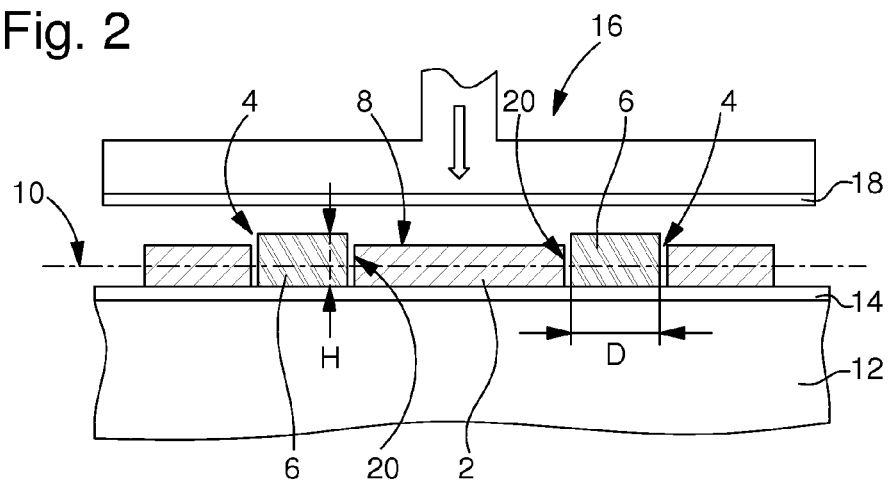
FIGS. 2 to 3 are schematic cross-sections of a next step of the fabrication method according to the invention.

According to the invention, the method of fabricating a plastic sheet including the following steps:

A) Taking a first sheet 2 formed of a first material having a first hardness or a first Vicat softening temperature, said first sheet having a plurality of apertures 4 (see FIG. 1);

B) Respectively placing in said plurality of apertures 4 a plurality of discs 6 formed of a second material having a second hardness lower than the first hardness, respectively a second Vicat softening temperature lower than the first Vicat softening temperature (see FIGS. 1 and 2; it will be noted that, for the sake of clarity of the drawing, FIG. 1 only shows the discs provided for one row of apertures).

In a variant, the first sheet has a plurality of cavities (blind holes) and the discs are placed in said plurality of cavities. In another variant, the first sheet has apertures (which traverse the first sheet) and cavities which receive all the discs formed of a second material, these apertures and cavities being arranged to receive first and second electronic units respectively.

In the geometric plane parallel to general plane 10 of the first sheet 2, the plurality of discs 6, provided in the aforementioned step B), have smaller dimensions than those of the corresponding apertures 4 and/or cavities and a greater height H, along an axis perpendicular to said general plane, than that of the corresponding apertures and/or cavities, so that they rise above a face 8 of the first sheet. For circular discs, it is the diameter D of these circular discs which will be smaller than the diameter of the corresponding apertures 4 and/or cavities. For rectangular discs, the smaller dimensions are of course the width and length of the rectangular discs. Other disc geometries may be provided in general plane 10 in other variants.

Preferably, the first sheet 2 and discs 6 are placed on a support 12 having a top layer 14 which is non-adherent to the first sheet and the discs. The top layer 14 is for example formed of Teflon®. Support 12 for example forms part of a press 16 shown schematically in FIG. 2.

Following the insertion of each disc 6 in a corresponding aperture 4 or cavity, the following step is provided for the disc:

C) Exerting a pressure on disc 6 to reduce the height thereof so that the disc is substantially flush with face 8 of first sheet 2 and is at least partially in contact with lateral wall 20 of the corresponding aperture or cavity, disc 6 then being connected to the first sheet.

Figure 3:
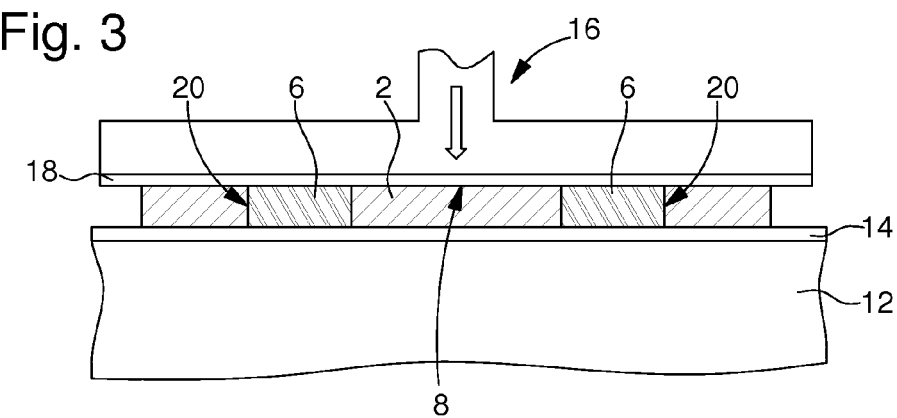

In a first implementation shown in FIG. 3, step C) is performed using laminating press 16. The bottom surface of the top part of the press is advantageously formed by a layer of Teflon® 18. It will be noted that layers 14 and 18 may be replaced by non-adherent sheets which are removable. In a preferred implementation, step C) consists of a hot lamination, the plurality of discs 6 being at least partially welded to the first sheet 2. Press 16 then includes a heating means. In this first implementation, the set of discs is placed in the corresponding apertures and then the aforementioned step C) is simultaneously performed for the plurality of discs. In a second implementation not shown in the Figures, steps B) and C) are performed cyclically for each disc or for subsets of discs among the plurality of discs. In a first variant, each disc is individually placed in the corresponding aperture using a tool. Next, a thermode is individually applied to the disc to perform step C); and these two steps are repeated with the following disc. Preferably, the dimensions of the thermode are slightly larger than those of the apertures. The thermode thus covers the aperture and a peripheral area of the aperture when a disc inserted into the aperture is pushed in. This can thus be termed a localised lamination. In a particular variant, the first tool and the thermode form one and the same tool and step C) immediately follows step B) for each disc. In a second variant, a first subset of discs is placed in a first subset of corresponding apertures. Next, several thermodes are respectively placed on the subset of discs and step C) of the method is simultaneously performed for the subset of discs. The subset of apertures is, for example, a line or a column of apertures in a first sheet having a matrix of apertures.

Figure 4:
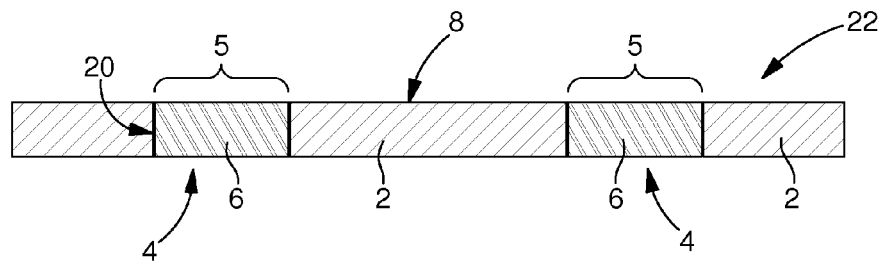
FIG. 4 shows a schematic cross-section of a first embodiment of a bimaterial plastic sheet according to the invention.

A first embodiment of a bimaterial plastic sheet 22 according to the invention, obtained notably via the fabrication method described above, is shown in cross-section in FIG. 4. This plastic sheet is formed of a first sheet 2 formed of a first material, having a first hardness. This first sheet 2 has a plurality of apertures which are filled by discs 6 formed of a second material having a second hardness, lower than the aforementioned first hardness. The second material adheres to the lateral wall 20 of the holes. The plurality of apertures 4 defines a plurality of areas 5 of the plastic sheet 22 in which the second material is located. This plurality of areas of lower hardness is respectively intended to receive a plurality of electronic units via penetration of the second material, as will be explained below.

In a first variant, the second hardness is less than 96 Shore A. In a second variant, the first hardness is more than 60 Shore D. In a particular embodiment, the first and second variants are advantageously combined. Preferably, the second material is formed by a thermoplastic polyurethane elastomer. For the definition of Shore A and Shore D, reference may be made to ISO standard 868 and DIN standard 53505 respectively. Thermoplastic polyurethane elastomers are sold, in particular, by BASF under the name Elastollan®.

In an alternative of the invention, the plastic sheet according to the invention is formed of a first material 2, having a first Vicat softening temperature, and of a second material 6 having a second Vicat softening temperature, which is lower than the first Vicat softening temperature. In a first variant, the second Vicat softening temperature under a load of 10 N is less than fifty degrees (50° C.). In a second variant, the first Vicat softening temperature under a load of 10 N is more than sixty-five degrees (65° C.). In a particular embodiment, the first and second variants are advantageously combined. Preferably, the second material is formed by a thermoplastic polyurethane elastomer. The Vicat softening temperature is the temperature measurement at which a pin with a section of 1 mm² penetrates a thermoplastic material to a depth of 1 mm tested under a load of 10 N or 50 N (for further information, reference may be made to ISO 306). The various embodiments of the plastic sheet of the invention also apply to this alternative.

Figure 5:
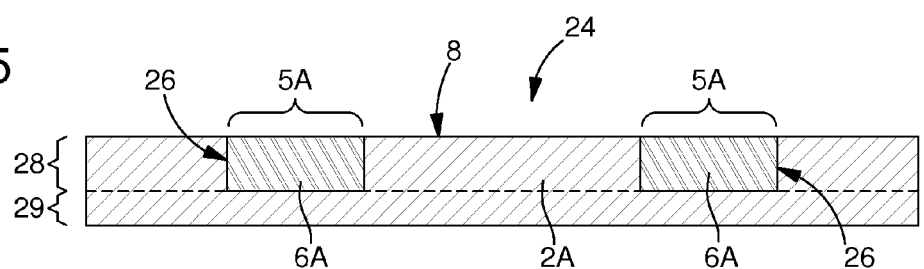
FIG. 5 is a schematic view of a second embodiment of a bimaterial plastic sheet according to the invention.

A second embodiment of a bimaterial plastic sheet 24 according to the invention is shown in cross-section in FIG. 5. This plastic sheet 24 differs from the first embodiment in that it is formed of a first sheet 2A formed of said first material and having a plurality of cavities 26 filled with discs 6A formed of said second material. The plurality of cavities 26 open out on the top face 8 of plastic sheet 24 and define a plurality of areas 5A in which the second material is located. This plurality of areas of lower hardness is respectively intended to receive a plurality of electronic units via penetration of the second material, as will be explained below. It will be noted that, in a variant embodiment, the first sheet 2A is formed by two layers 28 and 29, layer 28 having a plurality of holes whereas layer 29 is continuous and defines the bottom of cavities 26. Layers 28 and 29 may be welded or bonded in a preliminary step prior to the insertion of the plurality of discs 6A. Preferably, they are welded during step C) of the fabrication method described above, simultaneously as discs 6A are pushed in and welded to first sheet 2A.

It will be noted that, in a variant, discs 6 or 6A may be respectively bonded inside apertures 4 or cavities 26. In another variant, the second material is introduced into apertures 4 or cavities 26 by a technique of injecting or casting said second material.

Figure 6:
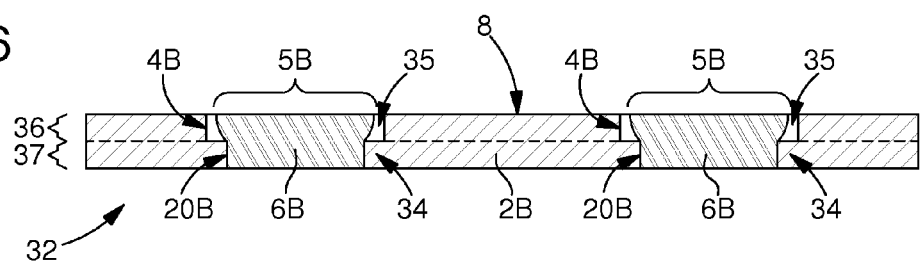
FIG. 6 is a schematic view of a third embodiment of a bimaterial plastic sheet according to the invention.

A third embodiment of a bimaterial plastic sheet 32 according to the invention is shown in cross-section in FIG. 6. The third embodiment differs from the preceding embodiments in that the plurality of apertures 4B in first sheet 2B each has an annular shoulder 34 in the bottom part thereof. Discs 6B have an initial diameter such that they abut against the lateral walls 20B of the respective shoulders 34 during the pushing in which occurs in step C) of the fabrication method described above, without however filling the annular areas 35 located above the annular shoulders. Discs 6B define, on the top face 8 of plastic sheet 32, areas 5B of lower hardness having a smaller diameter than that of the respective apertures 4B. The space remaining in each annular area 35 is advantageous for the subsequent penetration of an electronic unit, in particular when the unit has relatively large dimensions and the second material forming discs 6B is not compressible. Finally, it will be noted that, as in the second embodiment, the first sheet 2B is formed in a preferred variant of two layers 36 and 37, respectively having a first plurality of holes and a second plurality of holes, the latter having smaller diameters than those of the first plurality of holes. These two layers 36 and 37 are preferably hot laminated in a preliminary step prior to the insertion of discs 6B into apertures 4B.

It will be noted that, where cavities are provided in the first plastic sheet, it is possible to provide discs with dimensions such that the discs do not come into contact with the lateral wall of the cavities, the connection between these discs and the first sheet being achieved via the bottom of the cavities. It is thus possible for a circular space (empty space) to remain inside the cavities around the discs.

Figure 7:
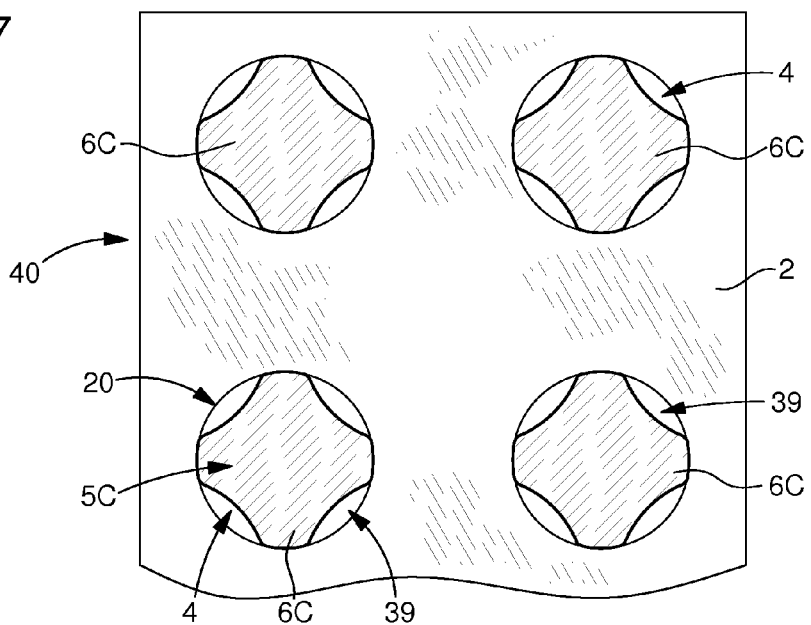
FIG. 7 is a schematic top view of a fourth embodiment of a bimaterial plastic sheet according to the invention.

A fourth embodiment of a bimaterial plastic sheet 40 according to the invention is shown in FIG. 7. The fourth embodiment differs in that the discs 6C inserted into apertures 4 of the first sheet 2 each have a profile in the general plane of the first sheet which is different from the contour of the corresponding aperture. In the fabrication method described above, the initial profile of disc 6C is selected such that, during step C) of the method, protruding portions of the disc come into contact with the lateral wall 20 of the corresponding aperture 4, while leaving empty areas 39 in the aperture. During the final pushing in of discs 6C, the protruding portions are slightly deformed due to the pressure exerted by lateral wall 20 on said protruding portions which eventually adhere to the first material forming first sheet 2. In a variant, only a small amount of heat is provided to deform the discs and ensure the connection thereof to the first sheet. It will be noted that it is also possible to provide at least one recess in the disc, particularly in the central area. Preferably, this recess is made in accordance with the electronic unit or units to be inserted into the corresponding aperture. For example, the recess will be positioned in an area provided for the thickest portion of the electronic unit or, in the case of several electronic units inserted into the same aperture in first sheet 2; the recess will be positioned in the area provided for the thickest electronic unit. In a variant, it is the most fragile portion of an electronic unit or the most fragile electronic unit of the electronic units used which is positioned in the area of the recess.

Figure 8:
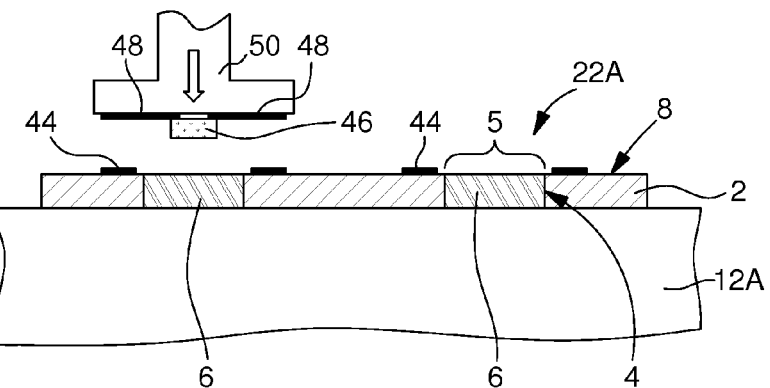
FIG. 8 is a schematic view of one use of a bimaterial sheet according to the invention in a first smart card fabrication method.
Figure 9:
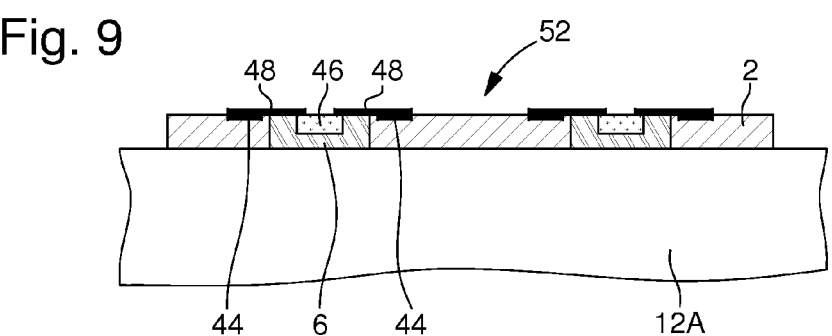
FIG. 9 shows an intermediate product occurring in the first smart card fabrication method and resulting from the step described in FIG. 8.

FIG. 8 shows a schematic view of one use of a plastic sheet 22A according to the invention in a first smart card fabrication method. The plastic sheet 22A is placed on a support 12A. The plastic sheet is similar to the plastic sheet 22 described above, with the addition of an electrical circuit arranged on top face 8. At the periphery of each area 5 defined by a disc 6 of low hardness, this electrical circuit includes contact pads 44 for electrical connection to an electronic unit 46. Electronic unit 46 and conductive segments 48 are moved above plastic sheet 22A using a gripping tool 50 so that the electronic unit is located above a disc 6. Next, the gripping tool lowers the assembly formed of the electronic unit and conductive segments towards disc 6 and inserts electronic unit 46 into the relatively soft material forming the disc. Thus, the electronic unit easily penetrates the plastic sheet according to the invention. In a variant, the material forming disc 6 is compressible. The intermediate product 52 shown in cross-section in FIG. 9 is then obtained. The material of disc 6 is either compressed or in a compressed state. In another variant, notably with an integrated circuit of small dimensions, the material forming disc 6 comes out of aperture 4 slightly when the electronic unit penetrates the aperture. This may permit the top surface of the integrated circuit to be partially covered and prevent any subsequent electrical problems between the integrated circuit and the conductive segments 48 which must only have electrical contact with one determined pad of the integrated circuit. In a variant implementation, disc 6 has a lower Vicat softening temperature and the penetration of electronic unit 46 into the disc is achieved by applying heat to soften the disc quickly without deforming first sheet 2 and without any risk of damaging the electronic unit.

Figure 10:
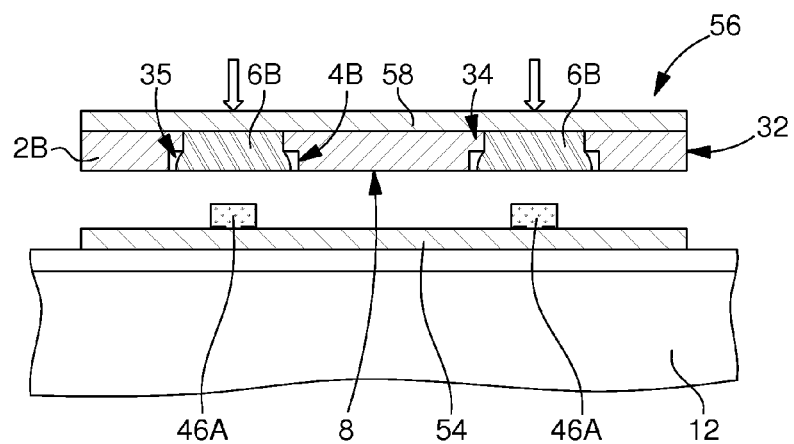
FIG. 10 is a schematic view of one use of a bimaterial sheet according to the invention in a second smart card fabrication method.
Figure 11:
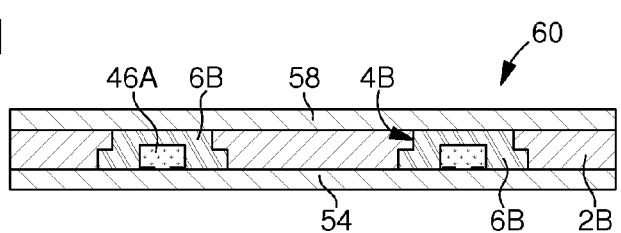
FIG. 11 shows an intermediate product occurring in the second smart card fabrication method and resulting from the step described in FIG. 10.

FIG. 10 is a schematic view of one use of a plastic sheet 56 according to the invention in a second smart card fabrication method. Plastic sheet 56 is formed by a plastic sheet 32 described above and a continuous plastic film 58 closing apertures 4B on the rear face side of plastic sheet 32. It is noted that apertures 4B define a plurality of cavities in plastic sheet 56. A printed circuit 54 with electronic units 46A arranged on the top surface thereof is placed on a support 12. Plastic sheet 56 is placed opposite printed circuit 58 and deposited on the printed circuit so that the electronic units are located facing discs 6B. Next, using a press, the electronic units are inserted into cavities 4B penetrating the material forming discs 6B. During this penetration, discs 6B are deformed and at least substantially fill the annular areas 35 by displacing the material of the discs so as to substantially reduce the spaces initially remaining in cavities 4B. A smart card 60 shown in cross-section in FIG. 11 is thus obtained.

What is claimed is:

1. A method of fabricating a plastic sheet involved in formation of a plurality of smart cards which respectively include a plurality of electronic units, said plastic sheet being configured to receive the plurality of electronic units by an at least partial penetration of the plurality of electronic units into a material forming said plastic sheet, wherein the method comprises:

taking a first sheet formed of a first material having a first Vicat softening temperature, said first sheet having a plurality of apertures and/or cavities;

respectively placing in said plurality of apertures and/or cavities a plurality of discs formed of a second material having a second Vicat softening temperature lower than the first Vicat softening temperature, said second material being the material selected for receiving the plurality of electronic units by the at least partial penetration of the plurality of electronic units into this material, said plurality of discs having, in a geometric plane thereof parallel to a general plane of the first sheet, dimensions smaller than those of the corresponding apertures and/or cavities and a height, along an axis perpendicular to said general plane, greater than that of the corresponding apertures and/or cavities, so that the discs rise above a face of the first sheet;

exerting a pressure on each disc of the plurality of discs so as to reduce the respective heights thereof so that the discs are substantially flush with said face of the first sheet and at least partially in contact with respective lateral walls of said apertures, and/or with respective lateral walls and/or respective bottoms of said cavities; the plurality of discs and the first sheet thus being connected together and forming said plastic sheet.

2. The fabrication method according to claim 1, wherein said respectively placing in said plurality of apertures and/or cavities the plurality of discs and said exerting the pressure on each disc are performed cyclically for each disc of said plurality of discs or for subsets of discs among said plurality of discs.

3. The fabrication method according to claim 1, wherein said exerting the pressure on each disc includes hot pushing in, the plurality of discs being at least partially welded to the first sheet.

4. The fabrication method according to claim 3, wherein said hot pushing in is individually performed for each disc of said plurality of discs using one or more thermode(s).

5. The fabrication method according to claim 1, wherein said second Vicat softening temperature under a load of 10 N is lower than fifty degrees.

6. The fabrication method according to claim 1, wherein said first Vicat softening temperature under a load of 10 N is lower than sixty-five degrees.

7. The fabrication method according to claim 1, wherein said second material is formed by a thermoplastic polyurethane elastomer.

8. The fabrication method according to claim 1, wherein the plurality of apertures and/or cavities are partially filled by said second material after said exerting the pressure on each disc of the plurality of discs.

9. A method of fabricating a plastic sheet involved in formation of a plurality of smart cards which respectively include a plurality of electronic units, said plastic sheet being configured to receive the plurality of electronic units by an at least partial penetration of the plurality of electronic units into a material forming said plastic sheet, wherein the method comprises:

taking a first sheet formed of a first material having a first hardness, said first sheet having a plurality of apertures and/or cavities;

respectively placing in said plurality of apertures and/or cavities a plurality of discs formed of a second material having a second hardness lower than the first hardness, said second material being the material selected for receiving the plurality of electronic units by the at least partial penetration of the plurality of electronic units into this material, said plurality of discs having, in a geometric plane thereof parallel to a general plane of the first sheet, dimensions smaller than those of the corresponding apertures and/or cavities and a height, along an axis perpendicular to said general plane, greater than that of the corresponding apertures and/or cavities, so that the discs rise above a face of the first sheet;

exerting a pressure on each disc of the plurality of discs so as to reduce the respective heights thereof so that the discs are substantially flush with said face of the first sheet and at least partially in contact with respective lateral walls of said apertures, and/or with respective lateral walls and/or respective bottoms of said cavities; the plurality of discs and the first sheet thus being connected together and forming said plastic sheet.

10. The fabrication method according to claim 9, wherein said respectively placing in said plurality of apertures and/or cavities the plurality of discs and said exerting the pressure on each disc are performed cyclically for each disc of said plurality of discs or for subsets of discs among said plurality of discs.

11. The fabrication method according to claim 9, wherein said exerting the pressure on each disc includes hot pushing in, the plurality of discs being at least partially welded to the first sheet.

12. The fabrication method according to claim 11, wherein said hot pushing in is individually performed for each disc of said plurality of discs using one or more thermode(s).

13. The fabrication method according to claim 9, wherein said second hardness is less than 96 Shore A.

14. The fabrication method according to claim 9, wherein said first hardness is more than 60 Shore D.

15. The fabrication method according to claim 9, wherein the plurality of apertures and/or cavities are partially filled by said second material after said exerting the pressure on each disc of the plurality of discs.

* * * * *